United States Patent [19]
Wanie et al.

[11] Patent Number: 4,883,137
[45] Date of Patent: *Nov. 28, 1989

[54] SYSTEM AND METHOD FOR CONTROLLING THE GROUND SPEED AND ENHANCING THE MANEUVERABILITY OF AN OFF-ROAD VEHICLE

[75] Inventors: Lee J. Wanie; Robert N. Behrens, both of Horicon; Stanley J. DeBraal, West Bend; Michael Bedis, Oconomowoc, all of Wis.

[73] Assignee: Deere & Company, Moline, Ill.

[*] Notice: The portion of the term of this patent subsequent to Jul. 26, 2005, has been disclaimed.

[21] Appl. No.: 216,689

[22] Filed: Jul. 7, 1988

Related U.S. Application Data

[62] Division of Ser. No. 901,716, Aug. 27, 1986, Pat. No. 4,759,417.

[51] Int. Cl.$^4$ .......................... B60K 23/00; B62D 1/00
[52] U.S. Cl. ..................... 180/6.34; 180/6.36; 180/273; 180/336; 60/490; 74/474; 74/480 R; 74/512
[58] Field of Search ..................... 180/6.32, 6.34, 6.36, 180/6.48, 272, 273, 305, 307, 336; 60/490, 492; 74/474, 479, 480 R, 512

[56] References Cited

U.S. PATENT DOCUMENTS

| | | | |
|---|---|---|---|
| 2,257,724 | 10/1941 | Bennetch | 60/19 |
| 2,362,521 | 11/1944 | Acton | 180/18 |
| 2,989,875 | 6/1961 | Torrance | 74/478 |
| 3,262,525 | 7/1966 | Ehlke et al. | 192/13 |
| 3,313,174 | 4/1967 | Walker et al. | 74/474 |
| 3,525,266 | 8/1970 | Brooks et al. | 74/481 |
| 3,537,328 | 11/1970 | Allen | 74/481 |
| 3,691,863 | 9/1972 | Shaffer | 74/478 |
| 3,943,712 | 3/1976 | Stuhr | 60/327 |
| 4,014,218 | 3/1977 | Brandt | 74/474 |
| 4,129,047 | 12/1978 | Dornan | 74/474 |
| 4,245,527 | 1/1981 | Hildebrecht | 74/874 |
| 4,341,129 | 7/1982 | Bondo | 74/481 |
| 4,608,879 | 9/1986 | Ishida et al. | 74/474 |
| 4,759,417 | 7/1988 | Wanie et al. | 180/6.36 X |

FOREIGN PATENT DOCUMENTS

| | | |
|---|---|---|
| 1630683 | 2/1967 | Fed. Rep. of Germany . |
| 1817849 | 4/1969 | Fed. Rep. of Germany . |
| 2601305 | 3/1976 | Fed. Rep. of Germany . |
| 2618708 | 4/1976 | Fed. Rep. of Germany . |
| 43-19860 | 8/1968 | Japan . |
| 48-2636 | 1/1973 | Japan . |
| 52-17298 | 5/1977 | Japan . |
| 56-59427 | 10/1979 | Japan . |
| 56-106972 | 1/1980 | Japan . |
| 57-52330 | 9/1980 | Japan . |
| 60-184729 | 12/1985 | Japan . |
| 61-3160 | 1/1986 | Japan . |
| 156837 | 5/1978 | Netherlands . |

Primary Examiner—Charles A. Marmor
Assistant Examiner—Brian L. Johnson

[57] ABSTRACT

A system and method for controlling the ground speed and enhancing the maneuverability of an off-road vehicle having systems for initially establishing and thereafter automatically returning the hydrostatic transmission to the neutral position, a pedal system interconnected with the neutral location and return system for selectively driving the vehicle in either the forward or the reverse direction, a brake system consisting of a left foot operated left and right turn brake subsystem which enhances the vehicle maneuverability, a right foot operated master brake system which is used to bring the vehicle to a complete hault and for emergencies, and a park brake system which is used to lock the brakes when the vehicle is at rest, a cruise control system which is interconnected with the pedal system and the brake system. The left foot operated turn brake subsystem enables an operator to utilize the turn brakes without the cruise control engaged and without having to take his foot off the forward or the reverse pedal. The cruise interconnections with the service brake and the pedal system provide a plurality of disengagement options for the cruise control system.

11 Claims, 14 Drawing Sheets

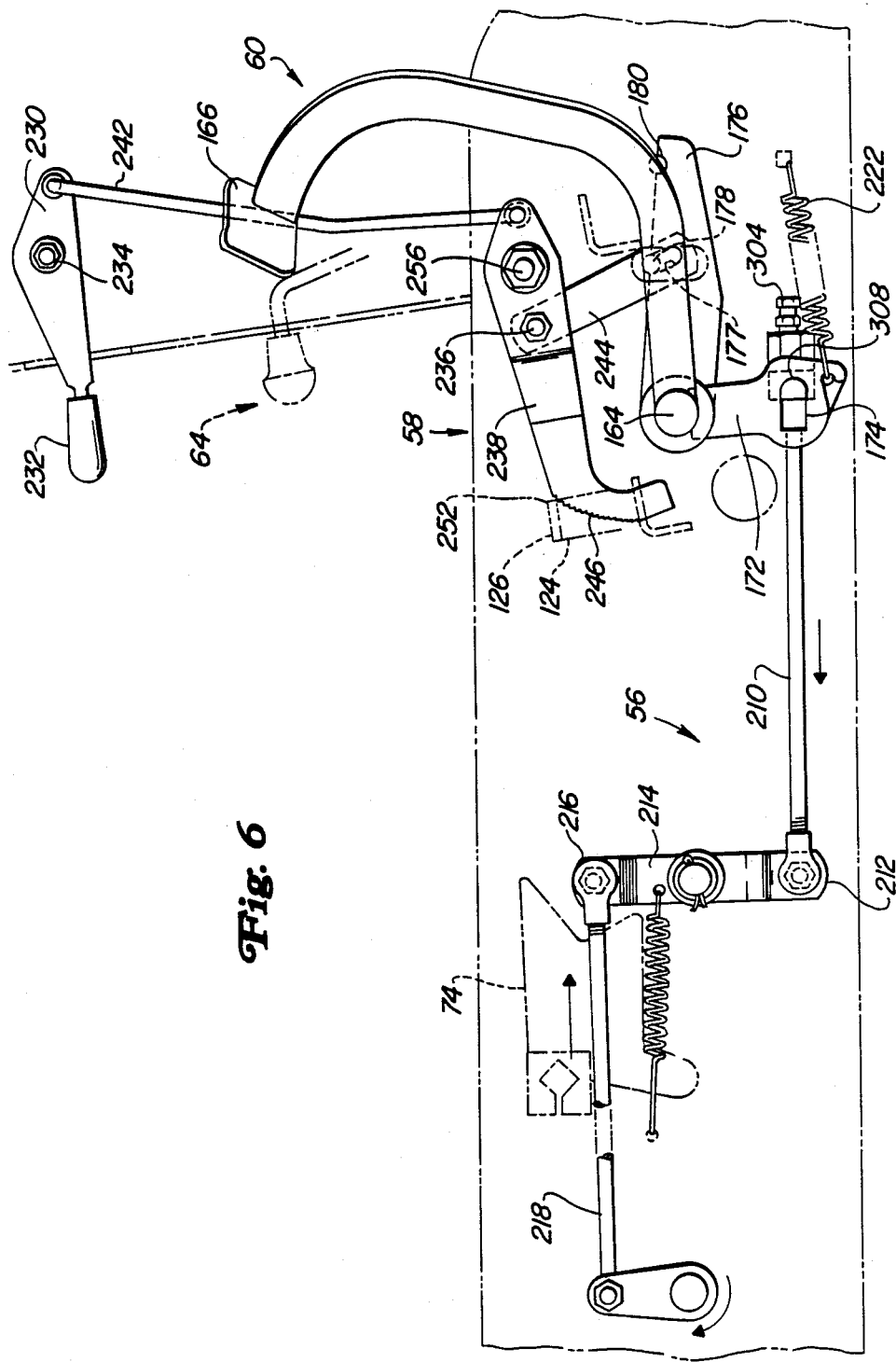

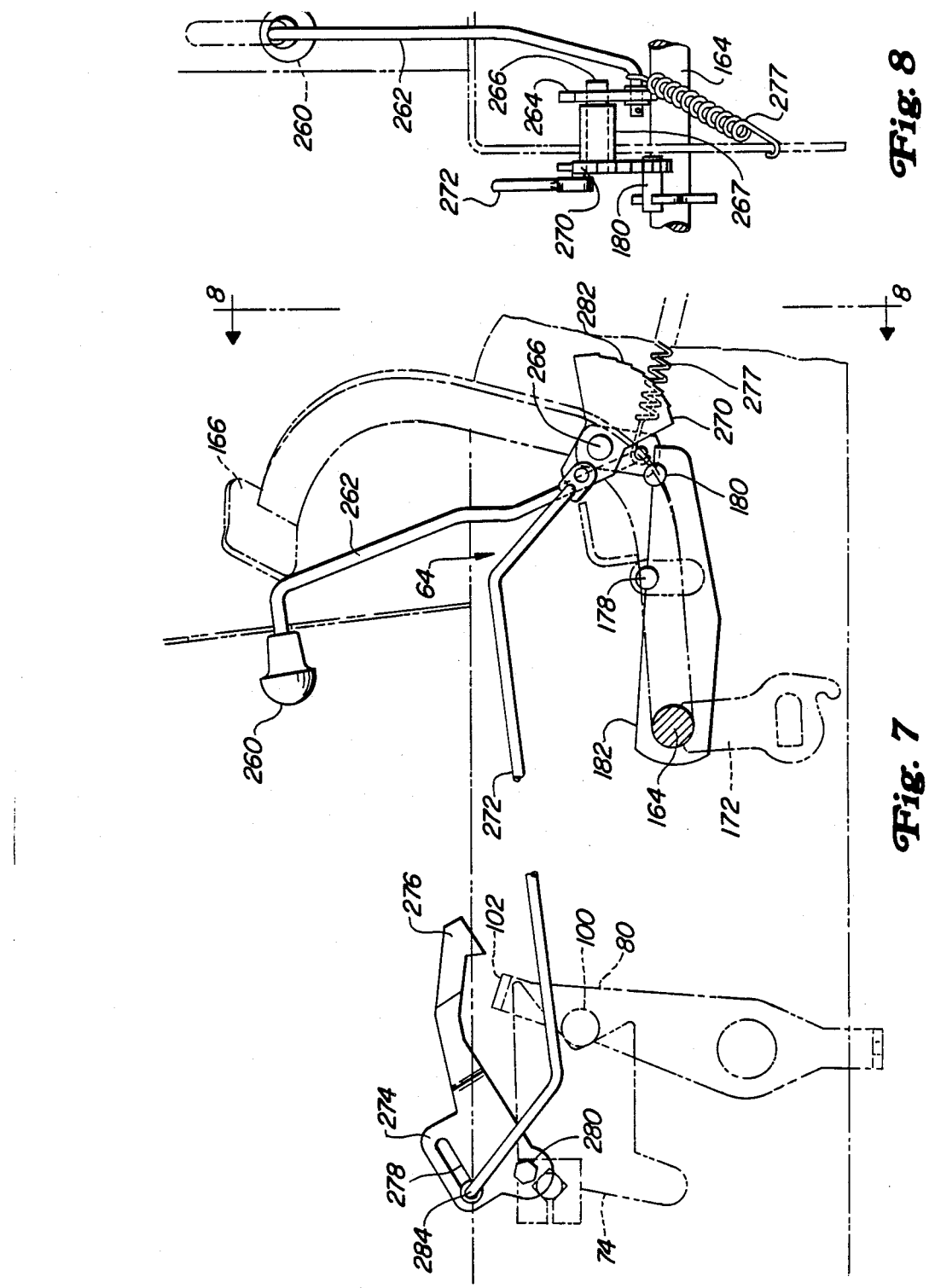

SYSTEM AND METHOD FOR CONTROLLING THE GROUND SPEED AND ENHANCING THE MANEUVERABILITY OF AN OFF-ROAD VEHICLE

This application is a division of application Ser. No. 901,716, filed Aug. 27, 1986, now U.S. Pat. No. 4,759,417 dated July 26, 1988.

BACKGROUND OF THE INVENTION

The present invention relates to a system for controlling the ground speed of a maneuverable off-road vehicle and, more specifically, relates to an interconnected system for controlling the ground speed of lawn and garden tractors and front mount mowers having hydrostatic transmissions, a specific type of variable speed transmission.

It is known to provide off-road vehicles, specifically small tractors and front mount mowers with systems for controlling their ground speed. Such vehicles usually are equipped with conventional systems for: selectively operating the vehicle in either the forward or reverse direction (engine, transmission, drive train); selectively stopping the ground motion of the vehicles (brakes); and selectively utilizing the brakes to assist with vehicle's maneuverability (left and right turn brakes). It is also known to provide such vehicles with a cruise control system for selectively maintaining or disengaging the position of a swash plate or control shaft.

Additionally, it is known to be very desirable to initially precisely locate and establish the hydrostatic or variable speed transmission's neutral position such that when in the neutral position, there is no ground movement or creep in either the forward or the reverse direction. Further, after initially establishing a precise neutral position, it is also desirable to either eliminate or at least reduce subsequent adjustments in order to maintain this initial precise location.

With respect to maintaining a constant swash plate or control shaft position, it has long been desirable to develop not only a reliable cruise control system but one which incorporate a plurality of rapid disengagement means which, when necessary, allows an operator to rapidly disengage the cruise control system in order to regain normal control of the vehicle.

Another previously unrealized goal of designers in the art relates to means for preventing the vehicle from being driven with the parking brake partially engaged or for preventing the operator from accidentally depressing a forward or reverse control pedal such as when mounting the vehicle thereby causing the vehicle to accelerate in either the forward or reverse direction. It is well known to provide a throttle and a gear selector attached to the engine, transmission and drive train for selectively operating the vehicle in either the forward or reverse directions. It is also well known to provide a system for selectively stopping the vehicle when operating in the forward and reverse directions. It is further well known to provide foot brakes to assist with vehicle maneuverability.

With respect to methods and apparatus for precisely locating the neutral position of a hydrostatic transmission, U.S. Pat. No. 3,488,955 commonly owned with the present application, illustrates one attempt to solve this problem. While the mechanical linkage disclosed did improve the initial location and subsequent return of the swash plate to the hydro neutral position, wear in the surfaces of the cam roller and the groove, could, over time, cause creep.

With regard to cruise control systems for off-road vehicles having hydrostatic transmissions, previously known systems have not incorporated at least three methods for positively effectuating cruise control disengagement.

A typical cruise control system utilizes a friction device to maintain the position of the swash plate. These friction devices can present problems, since the tendency of hydrostatic transmissions under load, such as going up a hill, is to seek the neutral position, the friction contact can be broken resulting in the vehicle slowing down. This naturally requires that the operator place the vehicle back in the cruise mode by reengaging the friction device. Obviously any friction device will, over time, suffer from wear. Thus, the cruise controls containing friction devices could require frequent replacement.

Accordingly, there is a need for an improved system and method for controlling the ground speed of a maneuverable offroad vehicle having a variable speed transmission, specifically a hydrostatic transmission which provides an operator with precise control of the vehicle. Such a system should have a precisely located neutral position; a foot controlled system for operating the vehicle in both the forward and reverse directions; a system for stopping the vehicle or brake system which includes: a left and right turn brake system for enhancing the vehicles maneuverability; a service brake system for emergency, rapid stopping and a park brake system; a system for selectively maintaining a constant control shaft or swash plate position when the vehicle is being operated in the forward direction only or "cruise control" system; at least three positive, separate means for disengaging the cruise control and a system for interconnecting the cruise control system, the foot controlled operating system and the brake system.

SUMMARY OF THE INVENTION

The present invention provides an improved system and method for obtaining and maintaining control of the ground speed of and for enhancing the maneuverability of a maneuverable off-road vehicle.

In the preferred embodiments, the system of the present invention is illustrated utilizing both a compact utility tractor and a front mount mower, each having a hydrostatic transmission and an operator seat. The system of the present invention includes: an engine operatively connected to a hydrostatic transmission; a foot pedal system, operatively connected to the hydrostatic transmission, for selectively engaging the transmission such that the vehicle is operated in either the forward or the reverse direction; a brake system, operatively connected to the vehicle, for selectively stopping the ground speed of the vehicle and for selectively slowing the vehicle's left wheel or right wheel ground speed respectively thereby enhancing the vehicle's maneuverability; a neutral position location and return system, operatively connected to the hydrostatic transmission swash plate and the foot pedal system, for precisely locating the hydrostatic transmission's neutral position and for automatically returning the transmission to the neutral position; a cruise control system, operatively connected to the transmission, the pedal system, and the brake system, for selectively maintaining the swash plate at a constant position when the vehicle is moving in the forward direction only and at least three separate methods, operatively connected to the cruise control system, for selectively disengaging, when necessary, the cruise control system.

A further aspect of the present invention includes a system, operatively connected to the brake system, for preventing the off-road vehicle from being operated with the parking brake partially engaged and for preventing the accidental acceleration of the vehicle by inadvertent engagement of the forward or reverse control pedals when mounting the vehicle or otherwise.

Accordingly, it is an object of the present invention to provide an improved system and method for controlling the ground speed of a maneuverable off-road vehicle; to provide an improved system and method for interconnecting the forward and reverse direction pedal control system, the service brake system and the left and right turn brake system; to provide an improved system and method for precisely locating the neutral position of the hydrostatic transmission; to provide an improved system and method for automatically returning the hydrostatic transmission to the initially located neutral position; to provide an improved cruise control system operative only when the vehicle is operating in the forward direction; to provide an improved system and a plurality of methods for selectively disengaging, when necessary, the cruise control system; to provide an improved system and method for preventing the accidental ground motion of the vehicle when stopped unless the operators seat is in the occupied position; and to provide an improved system and method for preventing vehicle operation when the parking brake is only partially engaged.

Other objects and advantages of the invention will be apparent from the following description, the accompanying drawings and the appended claims.

BRIEF DESCRIPTION OF THE DRAWINGS

FIG. 6 is a partial side view of the brake system of FIG. 1;

FIG. 7 is a partial side view of the parking brake system of FIG. 1;

FIG. 8 is a view taken along line 8—8 of FIG. 7;

DESCRIPTION OF THE PREFERRED EMBODIMENT

Figure 1:
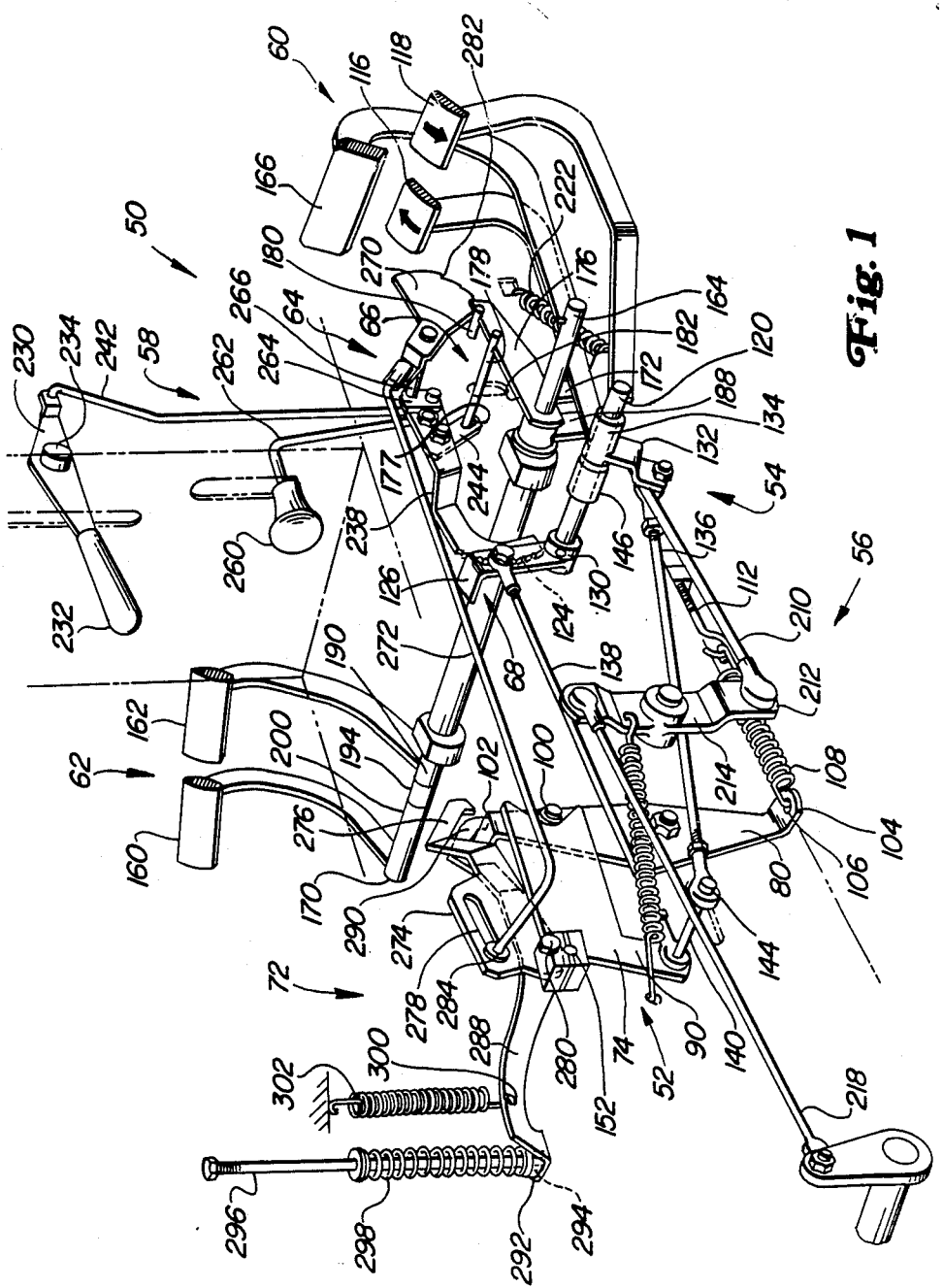
FIG. 1 is a partial isometric view of a compact utility tractor incorporating the improved ground speed control system and method of the present invention.

The ground speed control system for a small compact utility tractor, generally designated as 50, of the present invention is illustrated in FIGS. 1-8. The ground speed control system includes the following subsystems: a system 52 (see FIG. 3) for precisely establishing an accurate hydrostatic transmission neutral position and for automatically returning the hydrostatic transmission to the neutral position; a forward and reverse direction foot pedal system 54 (FIGS. 2 and 4); an interconnected brake system 56 (FIGS. 5 and 6) consisting of: a cruise control system 58 (FIG. 6), a service brake system 60 (FIG. 6), a left and a right turn brake system 62 (FIG. 5), and a parking brake system 64 (FIG. 6); a system for interconnecting the cruise control system to the service brake system; a system 68 (FIG. 1) for interconnecting the cruise control to the forward foot pedal; and a seat brake system 72 (FIG. 1) for positively preventing ground movement of the compact utility tractor by the accidental engagement of the forward or reverse pedals when the operator's seat is unoccupied.

Figure 2:
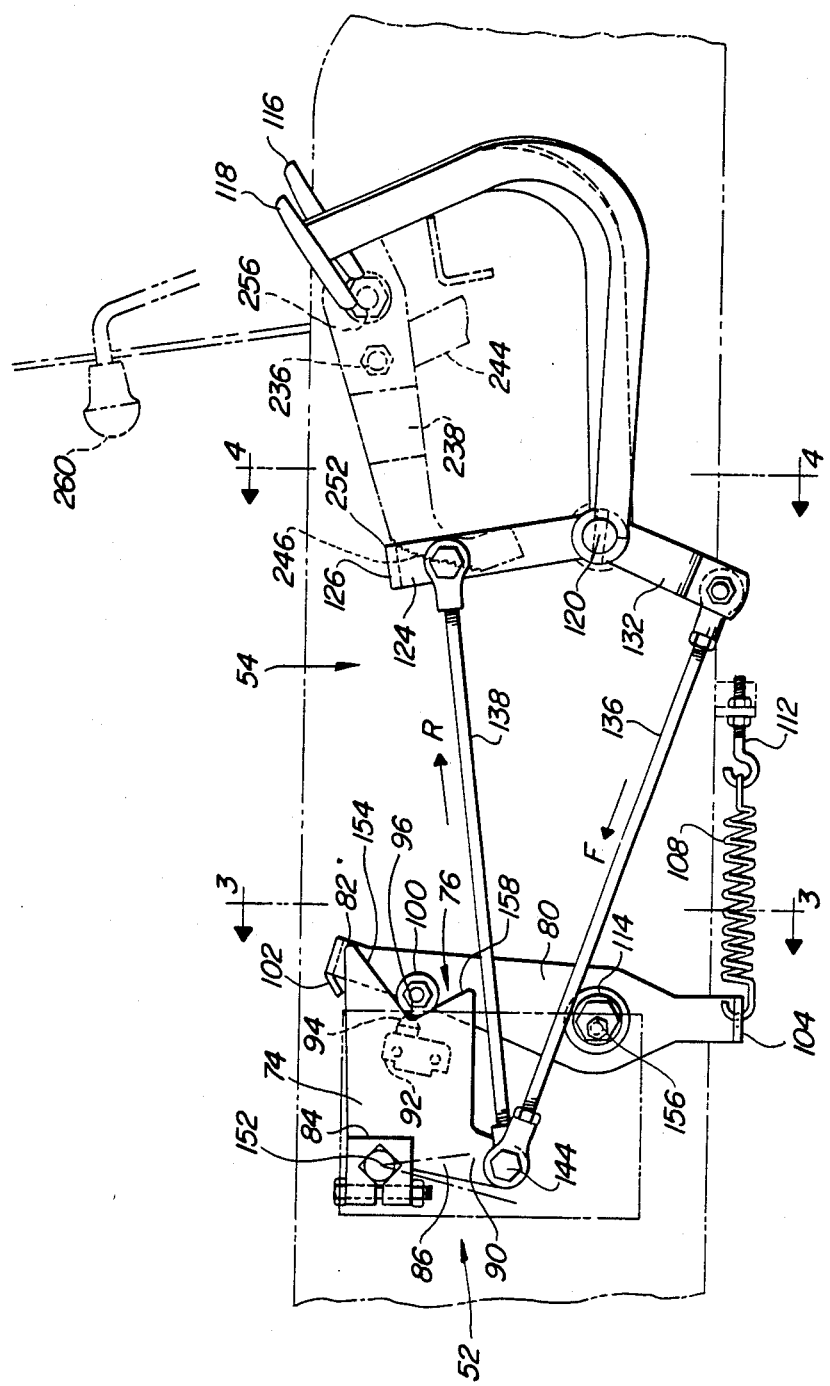
FIG. 2 is a partial side view illustrating the interconnection of the neutral location and return system and the pedal system of the compact utility tractor of FIG. 1.
Figure 4:
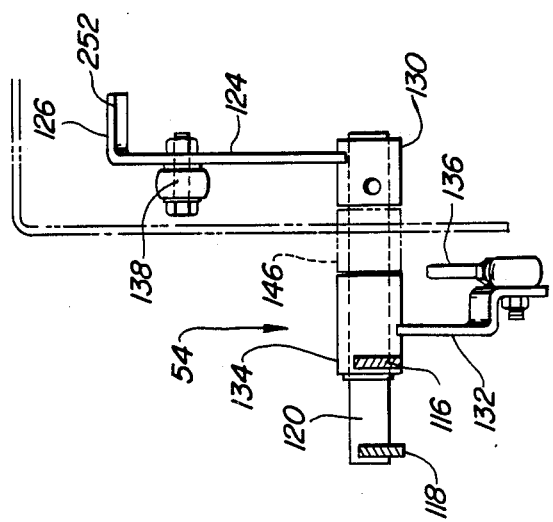
FIG. 4 is an isolated partial view taken along line 4—4 of FIG. 2.
Figure 3:
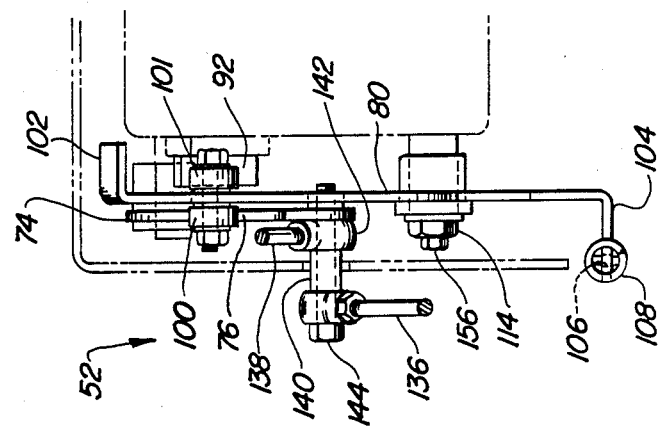
FIG. 3 is an isolated partial view taken along line 3—3 of FIG. 2.

As shown in FIGS. 1-3 the neutral position location and return system 52 consists of linkage designed to control the swash plate shaft 152 of a hydrostatic pump (not shown). The reversible hydrostatic pump (variable displacement) is driven by the vehicle engine (not shown) which in turn drives a hydrostatic motor (fixed displacement). The hydrostatic motor drives a gear driven differential (not shown). The differential drive axles (not shown) are connected to drive wheels (not shown). In operation, the engine RPM is substantially constant. Forward or reverse ground speed is varied by rotation of the pump swash plate shaft to the appropriate side of the neutral position.

Since initial neutral position location and the ability to automatically return thereto are essential to the operation of any vehicle having a hydrostatic transmission, the system for precisely locating and establishing the hydro neutral position and the system for precisely returning to the neutral position from either forward or reverse will be discussed first. One embodiment of the hydro neutral position system consists of a cam 74 having a V portion 76 connected to the transmission's swash plate (not shown) and a cam follower 80 pivotally connected to the transmission.

The cam 74 is generally rectangular having a V portion 76 formed on a first end 82, a cut-out portion formed on the upper portion of second end 86 and a connection extension 90 formed on the lower portion of the second end 86. A clamp block 84 is fixed in the cut-out portion and secures the cam 74 to the swash plate shaft 152. A conventional electrical switch 92 having a plunger 94 positioned proximate to the apex of the V is attached to one side of the cam 74 having its plunger 94 positioned in the apex of the V.

The cam follower 80 has two rollers 100, 101 rotatably connected to opposite sides thereof and two flanges 102, 104, extending in opposite directions at approximately ninety degrees to the cam follower, at opposite sides thereof. The lower flange 104 has an aperture 106 for connection to a spring 108 anchored to the vehicle frame by an adjustable eyebolt 112. The cam follower 80 is pivotally connected to the transmission by a conventional eccentric 114 which is utilized to optimally adjust the swash plate attached to the cam 74 to the hydro neutral position.

As described above, the cam 74 is connected to the swash plate shaft 152 for movement about its axis. The roller 100 is attached to the cam follower, engages the cam V, and moves along either leg of the V depending on which way the cam is rotated. Cam rotation causes the roller to move from the V apex which in turn causes the cam follower to rotate about the eccentric. This rotation stretches the spring 108. Upon the release of the force causing rotation of the cam, the spring 108 will bias the lower cam follower flange 104 counterclockwise moving the roller 100 on into the apex of the cam V.

As shown in FIGS. 2 and 3, the neutral start switch 92 is connected to the cam and positioned in transverse alignment with the cam V apex. The switch 92 has a conventional plunger 94 which, in order for the vehicle to start, must be depressed by the second roller 101 on the inside portion of the cam follower 80.

With this particular arrangement, precise location of the neutral position is facilitated. Specifically, since the neutral start switch 92 is positioned on the cam 74 such that the inside cam roller 101 depresses it only when the rollers are positioned in the apex of the V and since the swash plate and cam are adjusted so that the apex of the V and the cam roller is positioned in the apex of the V only when the transmission is in the neutral position, the V profile combined with the rollers and switch provide for exact initial location and sensing of the neutral position. Thus, once located and set, due to the closeness of the neutral start switch 92 to the actual swash plate, deviation from the hydro-neutral position is, if any, extremely minimal and sensing of the position is extremely accurate.

As shown in FIGS. 1-4 the forward and reverse pedal system 54 is interconnected to the neutral location and return system 52. The pedal system 54 is utilized to rotate the cam 74 and the swash plate connected thereto. The neutral return system automatically returns the hydrostatic transmission to neutral rapidly, but smoothly upon disengagement of either the forward 116 or the reverse 118 pedal.

The forward and reverse pedal system consists of a forward (left) 116 pedal and a reverse (right) 118 pedal both operatively connected to a shaft 120. The reverse pedal 118 is fixed to one end of the shaft 120 and a reverse arm 124, with a flange 126 at one end and a hub 130 at its other end, is conventionally attached to the other shaft end for rotation within the shaft. The attached arm 124 extends above the shaft 120. The forward foot pedal 116 is attached to a pedal bushing 134 (FIG. 4) rotatably mounted on the shaft 120. The bushing 134 has a forward arm 132 connected thereto and extending below shaft 120.

Forward and reverse connecting rods 136, 138 are pivotably connected to the forward 132 and reverse 124 arms, respectively, at one end and are both connected at their respective other ends to the cam extension portion 90 by a bolt 144 and held in spaced apart position by a spacer 140 on the bolt 144. Since the forward pedal 116 is connected to the bushing 134 which is rotatably mounted on the shaft 120, the key to the operation of the pedal system 54 is that the forward connecting rod 136 is located below the shaft 120 and the reverse connecting rod 138 is located above the shaft 120 and both rods are connected to the cam below the cam pivot point 152. Thus, when different pedals are depressed, the cam 74 is rotated in opposite directions.

In order to drive the vehicle in either the forward or reverse directions, an operator would depress either the forward or the reverse pedal. If the operator were to depress the forward pedal, which is rotatably connected to the shaft 120, the lower arm 132 would rotate clockwise which would compress the forward connecting rod 136 to the rear which in turn would rotate the cam 74 about the axis of shaft 152 clockwise. The roller 100 in the cam follower 80 moves along the upper surface 154 of the cam V 76 causing the cam follower 80 to rotate clockwise about its pivot 156.

As the forward pedal 116 is depressed, the reverse pedal 118 is rotated an equal distance in the opposite direction. If the operator were to remove his foot from the forward pedal, the spring 108 anchored to the frame by the adjustable eyebolt 112 would tend to pull the upper flange 102 of the cam follower 80 counterclockwise causing the roller 100 to seek the apex 96 of the cam V 76, thus, automatically returning the swash plate to the neutral position and the pedals 116, 118 to the rest position.

In order to propel the vehicle in the reverse direction, an operator would depress the reverse pedal 118 rotating the shaft arm 124 connected to the reverse connection rod 138 clockwise which would then rotate the cam 74 counterclockwise about the swash plate shaft 152 causing the cam follower roller 100 to move along the lower cam V surface 158 which would also cause the cam follower 80 to rotate clockwise.

Thus, it can be seen that the forward and reverse pedals operate in tandem, i.e. that displacement of one or the other in a direction is met by equal displacement of the other in the opposite direction. The adjustable eyebolt 112 and spring 108 connected to the cam follower 80 constantly provides tension on the cam follower 80 such that upon the absence of pressure being applied on either pedal 116, 118, the cam follower 80 is rotated in a counterclockwise direction forcing the roller 100 attached to the cam follower 80 to seek the apex 96 of the cam V 76 thus, automatically returning the cam to the neutral position.

It should be pointed out that one surface of the cam V is approximately twice as long as the opposing surface. Since it is desirable to drive the illustrated vehicle faster in forward than in reverse, the forward portion of the V surface has twice the surface length of the reverse surface 158. The relative cam V surface lengths could be designed in conjunction with other design parameters to accomplish any desirable relative speed relationship between forward and reverse within the limits of a particular hydrostatic transmission.

The interconnected brake system 56 consisting of the left and right turn brake subsystem 62, the service brake subsystem 60 and the parking brake subsystem 64 is shown in FIGS. 1, 5-8.

The turn brake subsystem 62 consists of left foot operated outboard 160 and inboard 162 pedals. When applied, the outboard pedal 160 assists with left turns and the inboard pedal 162 with right turns. The service brake subsystem 60 is right foot operated and simultaneously applies both the left and right turn brakes.

The service brake pedal and the two turn brake pedals are assembled to the frame of the tractor utilizing a series of components which, when assembled, provides a unique system for allowing the individual turn brakes to be applied without the operator removing his foot from the forward or reverse pedals.

Figure 5:
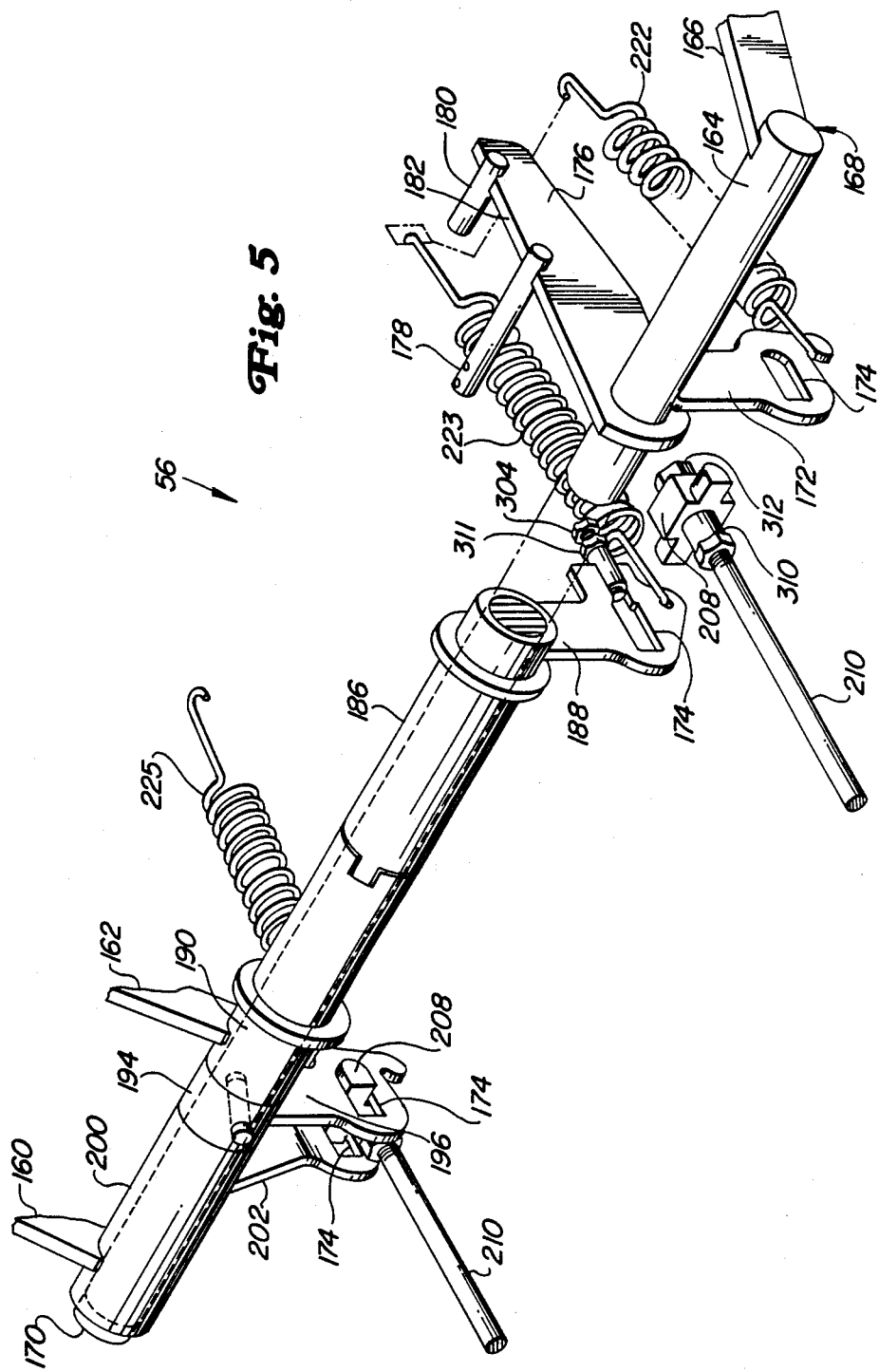
FIG. 5 is a partial isometric view of the brake system of FIG. 1.
Figure 9:
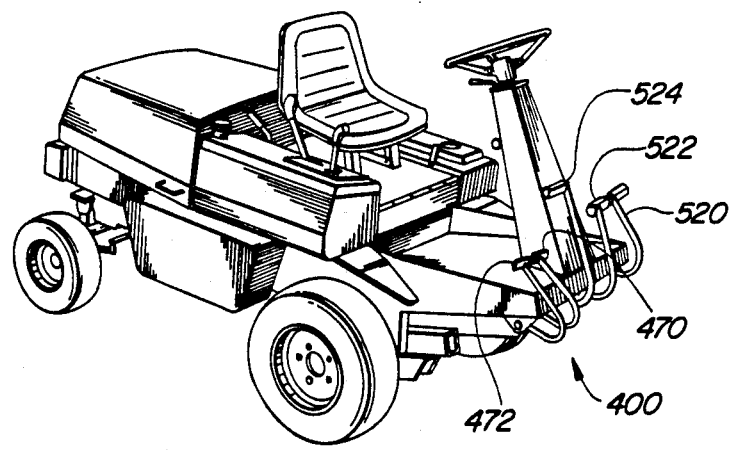
FIG. 9 is an isometric view of a front mount mower incorporating the improved ground control speed system and method of the present invention.

Specifically, as shown in FIG. 5, the brake system 56 consists of a shaft 164 which runs the entire width of the frame. The shaft 164 has the service brake pedal 166 connected thereto at one end 168 and an aperture (not shown) for receiving a cotter pin at the other end 170. An arm 172 having an elongated slot 174 formed therein is connected to the brake shaft 164 proximate the service brake pedal 166 connection. A second arm 176 having a pair of studs 178, 180 connected to the top surface 182 thereof, is also connected to the brake shaft 164 in near proximity to the first arm 172. A bushing 186 having a third arm 188 with an elongated slot 174 formed therein is conventionally assembled on the shaft 164. This bushing 186 extends to approximately the center of the shaft 164 where it is conventionally connected to a similar bushing 190 extending through the left frame member.

The right turn pedal 162 is connected to the second bushing 190. Immediately next to the right turn pedal bushing 190, a third bushing 194, having an fourth arm 196 with an elongated slot 174 is conventionally connected to the shaft 164 such that the bushing 194 and attached arm 196 will rotate when the shaft 164 rotates.

The final portion assembled over the shaft 164 is a bushing 200 carrying the left turn brake pedal 160 and a fifth arm 202 having an elongated slot 174 formed therein mounted thereon. These components rotate independently of the shaft.

As shown in FIGS. 5 and 6, the four arms 172, 188, 196 and 202, each having one of the elongated slots 174, form a pair of arms on each side of the brake system shaft. The pairs of arms (172, 188), (196, 202) are respectively connected by separate linkage systems to separate brake drums (not shown). Specifically, a pair of members 208 are respectively positioned in the elongated slots of the two pair of arms (172, 188), (196, 202). Each member 208 is connected by a rod 210 to the lower end 212 of a bell crank 214 pivotally mounted to the vehicle. The upper end 216 of the bell crank 214 is further connected by a rod 218 to a respective brake (not shown). The brake arms 172, 188, 196, 202 are each biased toward the front end of the vehicle by springs 222, 223 and 225 connected to the lower end of the arms 172, 188 and 202, respectively.

At this point, it should be pointed out that while the right brake system has been illustrated in detail, a mirror image of the system shown in FIGS. 1 and 6 is attached to the arms 196, 202 by another member 208 having identical components attached to the left brake.

With this arrangement, it is possible for an operator to utilize his left and right turn brakes without having to remove his foot from the forward or reverse pedal, as stated earlier. Without this particular arrangement, previously the operator had been required to remove his foot from the pedal in order to operate the turn brakes thereby losing considerable speed unless the vehicle were equipped with a cruise control.

If the operator depresses the left turn brake pedal 160, the outer hub 200 will rotate clockwise about the brake shaft 164 causing the fifth arm 202 to rotate toward the rear of the vehicle placing the brake rod 210 in compression, rotating the left bell crank clockwise which would pull the upper brake rod 218 thereby rotating the brake arm and applying the left wheel brake. None of the other four arms 172, 176, 188 or 196 are effected because the member 208 slides rearwardly in slot 174 of arm 196 and the shaft 164 will not be rotated.

If the operator depresses the right turn brake 162, since that turn brake is connected to arm 188 through the two bushings 190, 186, the right brake rod 210 connected thereto is placed in compression, which rotates the right bell crank 214 clockwise thereby pulling right rod 218 and applying the right wheel brake.

In order to stop the vehicle quickly, the service brake pedal 166, which is positioned above and between the forward 116 and reverse 118 pedals on the right hand side of the vehicle, is depressed. Upon depressing the service brake pedal 166, the brake shaft 164 is rotated clockwise which in turn rotates the first arm 172, the second arm 176 having the two studs 178, 180 attached, and the fourth arm 196 on the left side which is connected to the brake shaft 164. Rotation of arms 172, 196 engages each member 208 placing the respective connecting rods 210 in compression, rotating the respective bell cranks 214 clockwise thereby simultaneously applying both brakes.

Due to the elongated slots 174 (lost motion slots) in each of the four arms 172, 188, 196 and 202, application of one turn brake will not apply the other brake. The elongated slots in the four brake arms function as lost motion systems. The key to achieving independent turn brake control is the lost motion slots 174 and the connection member assembled therein. One arm selectively moves the member 208 mounted between the two slots on each side. The member 208 does not move any of the arms 172, 188, 196, 202.

As illustrated in FIG. 6, the cruise control system 58 is hand operated with a control lever 230 located below the steering wheel (not shown). The cruise control can only be engaged when the vehicle is moving in the forward direction. To engage the cruise control system, upward lever rotation is required. Cruise control disengagement can be accomplished in three ways: (1) by downward rotation of the lever 230, (2) further depressing the forward foot pedal 116 and (3) depressing on the service brake pedal 166.

As illustrated, the cruise control system 58 is a mechanical system which utilizes a ratchet and pawl device for positive swash plate position retention. A knob 232 is attached to the lever 230 which is pivotally mounted to the vehicle at 234. The lever 230 is connected to one end of a cruise control latch 238 by a link 242. The cruise control latch 238 is connected to one end of a strap 244. The other end of the strap 244 is provided with a slot 177 and has a lost motion connection to stud 178. Ratchet teeth 246 for engaging the flange 126 acting as a pawl are provided on the other end of the cruise control latch 238.

As previously stated with reference to FIG. 1, when the forward pedal 116 is depressed, the arm 124 and flange 126 are rotated counterclockwise away from the teeth 246 thus creating a space between the forward edge of the flange 126 and the teeth 246 on the cruise control latch 238.

To engage the ratchet teeth 246 with the pawl flange 126, the knob 232 is pulled upward pivoting the lever 230 about pivot point 234. The link 242 connected to the far end of the lever is compressed between the lever 230 and the cruise control latch 238. In response to this compression, the cruise control latch 238 pivots about the pivot point 256 established by the connection of the cruise control latch 238 to the vehicle, thus rotating the ratchet teeth 246 upward relative to flange 126 until one of the teeth engages the flange.

At this point, the cruise control is firmly engaged and an operator may then release pressure from the forward foot pedal 116 and the vehicle will continue to operate with the cam attached to the swash plate locked in a specific position. The cruise control latch 238 is designed to allow for engagement between the flange 126 and the ratchet teeth 246 such that minimum to maximum swash plate deflection is provided thereby.

If the vehicle were driven in reverse, the flange 126 would be rotated clockwise over the upward arc of the cruise control latch 238 thereby preventing the teeth 246 from engaging the forward edge 252 of the flange 126. Since the cam 74 is biased toward the neutral position by the spring 108 adjustably attached to the cam follower 80 and the frame, the flange 126 is biased toward the cruise control latch 238 thereby providing the pressure necessary to maintain flange engagement with the teeth.

Since one of the features of the present invention is to provide a plurality of methods for disengaging the cruise control once engaged, the three disengagement methods will now be discussed. To disengage the cruise control system, an operator need only exert pressure down on the cruise control knob 232 which would then pull the connecting link upwardly moving the end of the cruise control latch 238 connected to the rod 242 also upward toward the lever 230 causing the cruise control latch 238 to pivot about the pivot point 256 which would then rotate the teeth counterclockwise down and away from engagement with the flange 126.

A second method of disengaging the cruise control is by further depressing the forward control pedal 116. If the forward foot control is depressed further, the flange 126 connected to the arm 124 is further rotated counterclockwise away from engagement with the teeth 246 and the cruise control latch 238 then falls by gravity from engagement with the flange 126 pawl.

A third method of disengaging the cruise control system is by depressing the service brake pedal 166. By depressing the service brake pedal 166, the arm 176 having the long stud 178 connected thereto is rotated clockwise. The stud 178, which is connected to a slot 177 in the strap 244, pulls the ratchet teeth 246 out of engagement with the flange 126 pawl.

One important feature of the ratchet and pawl cruise control system and the location of the turning brakes is that an operator can utilize the turning brakes without having the cruise control engaged. Additionally, with the cruise control engaged the operator can use the turning assist brake without disengaging the cruise control.

Another important feature of the cruise control of the present invention is to ensure that all ratchet teeth are utilized. This is accomplished by means of a conventional eccentric 236 which enables the cruise control latch 238 to be precisely located relative to flange 126. The eccentric 236 provides relative motion for moving the cruise control latch 238 up or down in order to set the cruise control latch 238 such that the very first ratchet tooth will be engaged by the flange pawl for minimum swash plate deflection and such that the very last ratchet tooth will be engaged by the pawl for maximum swash plate deflection.

As shown in FIGS. 7 and 8, the parking brake system 64 consists of a knob 260 and link 262 connected to a strap 264 having one end secured to a shaft 266 rotatably mounted on a bushing 267 covered by the frame (see FIG. 8). A cam 270 is also secured to the shaft 266. A second rod 272 has one end connected to the cam 270 and its other end connected to a hydrolock arm 274 having a hook member 276 for engaging the upper flange 102 of the cam follower 80. The second rod 272 is connected to arm 274 with an elongated slot 278 in the arm 274. The arm 274 is pivotally connected to the vehicle by a bolt 280 (see FIGS. 1 and 7).

To engage the parking brake, an operator depresses the service brake pedal 166 which rotates the brake shaft 164 having first arm 172, second arm 176, and fourth arm 196 attached thereto, clockwise lowering the second stud 180 attached at the far end of the second arm 176. The operator simultaneously raises the knob 260 of the parking brake which rotates the cam 270 having teeth 282 formed therein on one surface until it engages the stud 180. This rotation pulls rod 272 toward the front of the vehicle which in turn slides the rod's connection 284 to the arm 274 toward the front of tractor which subsequently allows the hook member 276 to move clockwise by force of gravity latching the hook 276 over the upper flange 102 of the cam follower 80.

When the parking brake is engaged, the brake shaft 164 is locked in place by the cam 270. The first arm 172 and the fourth arm 196 are both rotated clockwise, compressing both lower brake connecting rods 210, rotating the bell cranks 214 clockwise, pulling the upper brake connecting rod 218 so that both the left and right brakes are engaged. Additionally, with the cam 270 locked in position, the hook member 276 of the arm 270 positively prevents rotation of the cam follower 80 and hence the cam 74 so that if an operator should attempt to depress the forward or the reverse pedals with the engine running, movement of the vehicle would not occur due to the inability of the hydrostatic transmission to move from the neutral position.

To disengage the parking brake, the service brake is depressed, releasing contact between the stud 180 and the cam 270. Once this contact is broken, a spring 277 biases cam 270 counterclockwise out of contact with the stud 180.

The cam 270 is designed such that when locked by stud 180, the cam tends to maintain engagement therewith unless that contact is deliberately broken by depressing the service brake pedal.

The seat brake system illustrated in FIG. 1 is an additional safety system which operates for preventing vehicle movement as might be caused by accidentally engaging or depressing either the forward or reverse pedal system 54. The seat brake system 72 consists of an elongated hydrolock arm or lever 288 having a hook 290 at one end for securing the upper flange 102 of the cam follower 80 and having a flange 292 having an aperture 294 formed therein at the other end thereof. The flange aperture receives a rod 296 having a spring 298 mounted thereon which acts in compression between the flange and a shoulder on the rod. The lever 288 is pivotably connected to the vehicle by the bolt 280. An aperture 300 for receiving a second spring 302 is positioned near the flange end of the lever.

The spring 302 tends to rotate the flange portion upwardly about the bolt 280 and therefore tends to engage the hook 290 over the upper flange 102 of the cam follower 80. Spring 298 acts as a cushion to absorb the pressure from the operator's seat when traversing rough terrain such that the lever 288 is not deformed.

In order to release the hook 290 from engagement with the cam follower flange 102, it is necessary that pressure be applied to the upper end of rod 296 such as that provided by an operator sitting in the operator's seat. This pressure will shift the rod 296 against the spring 298 whose compression force overcomes the force of spring 203 and rotates lever 288 counterclockwise about pivot 280, thereby raising hook 290 from engagement with cam follower flange 102.

This system provides a positive system for preventing the forward 116 or reverse 118 pedal from being inadvertently engaged with the engine running and the operator not occupying the seat thereby preventing movement which might lead to possible injury.

DETAILED DESCRIPTION OF AN ALTERNATE EMBODIMENT

Referring now to the drawings and specifically to FIGS. 9-15, there is illustrated an alternate embodiment incorporating the present invention, generally indicated as 400, installed on a front mount mower. The front mount mower is generally conventionally constructed except for the present invention which results in an improved system and method for controlling vehicle ground speed and for enhancing maneuverability.

As shown in FIGS. 10 through 15, vehicle subsystems, which, when combined, form the ground speed control system of the present invention include: a system 402 (see FIGS. 10 and 11) for initially precisely establishing an accurate hydrostatic transmission neutral position and for automatically returning the hydrostatic transmission to the neutral position; a forward and reverse direction control foot pedal system 404 (see FIG. 11); a cruise control system 406 (see FIG. 15); a brake system consisting of: a service brake control system 410 (see FIG. 12), a left and a right turn brake control system 412 (see FIG. 13), and a parking brake system 414 (see FIG. 14); a system 416 (see FIG. 15) for interconnecting the cruise control to the brake system and the forward control pedal and a plurality of means interconnected to the cruise control system for selectively disengaging the cruise control system 406.

Prior to describing each individual subsystem and their interconnection, it is important to note that for proper vehicle operation the neutral hydrostatic transmission position must be initially precisely located and thereafter be accurately reestablished by a system for accurately and automatically returning the transmission to the neutral position upon disengagement of either of the forward or reverse direction foot control pedals.

Figure 11:
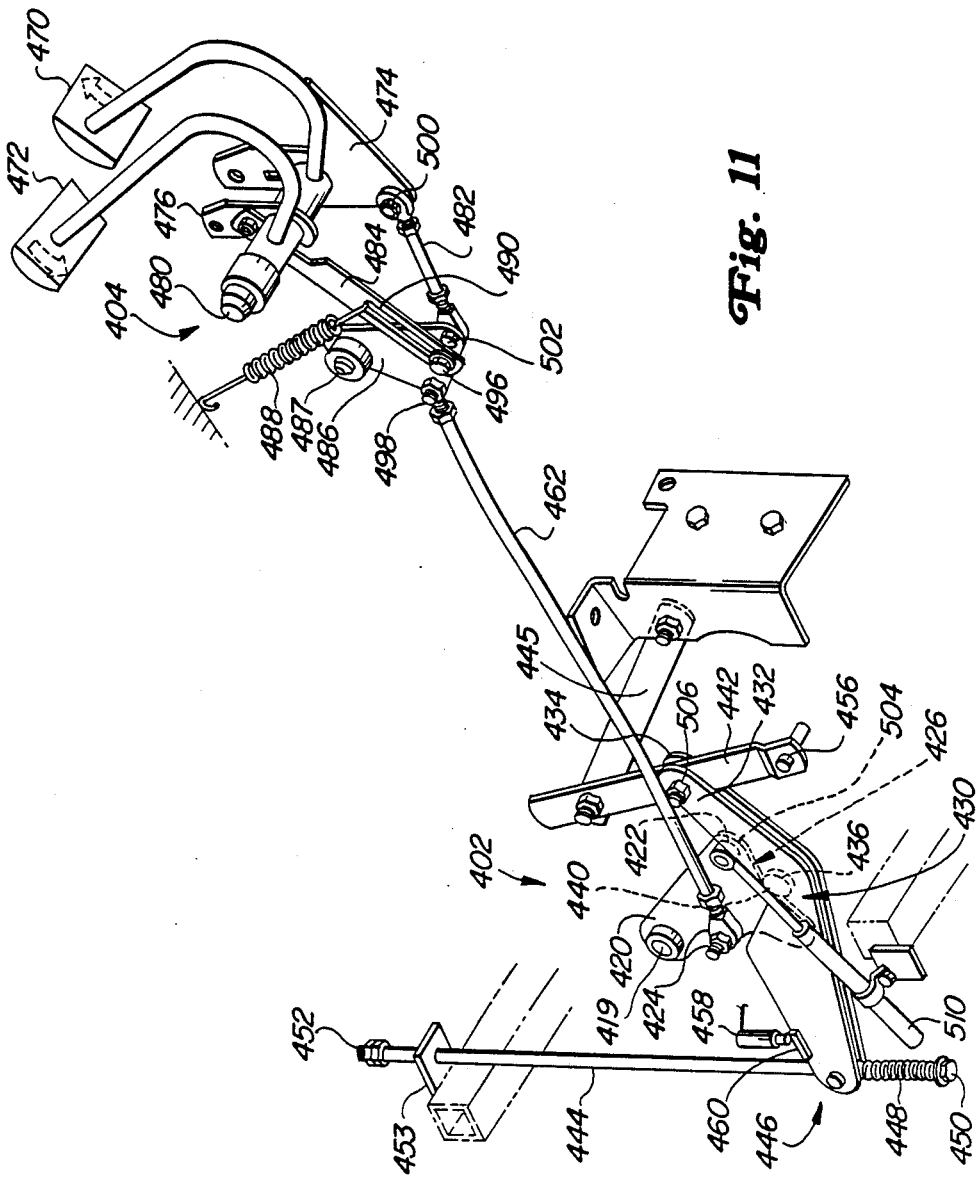
FIG. 11 is a partial view illustrating the interconnection of the neutral location and return system and the pedal system of the front mount mower of FIG. 10.
Figure 12:
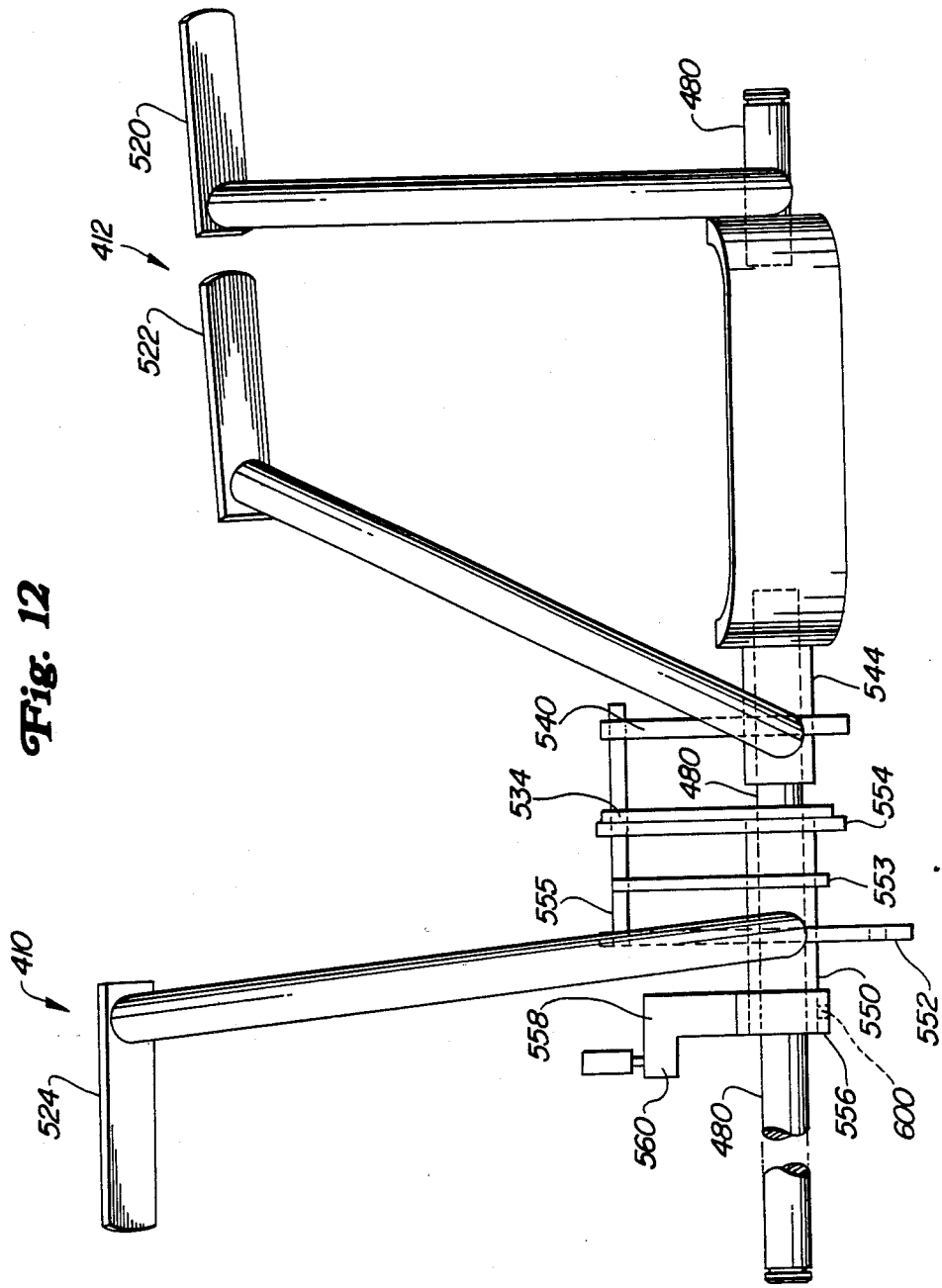
FIG. 12 is a partial front view of the turn and service brake pedals of the front mount mower of FIG. 10.

As shown in FIG. 11, the neutral location and return system 402 linkage is adjustable relative to a shaft 419 connected to a swash plate (not shown) such that the transmission neutral position can be precisely located and that no ground speed motion (creep) will occur when the engine is idling. This adjustable neutral linkage design consists of a fixed fulcrum 456 for an adjustable arm 442, a cam profile 426 on a swash plate arm cam 420, a cam follower 430, a cam follower rod 444, a shock absorber 510 and a pedal system connecting rod 462.

Specifically, a swash plate arm or cam 420 has a V-shaped surface 426 and includes a shock absorber mount 422 and a connection point 424 for the rod 462 and its associated foot pedal system 404.

The cam follower 430 consists of two identical plates 432, 434 spaced apart by a roller 436 mounted between the two plates. When assembled to the vehicle, the roller 436 is positioned in the apex of the V-shaped portion 426 of the cam 420. The cam follower 430 is connected at its one end to an adjustable arm 442 and to the rod 444 at its other end. The rod 444 is mounted through the link 446 which is formed by one end of the cam follower 430 and has a spring 448 positioned between the rod end and the link 446. An opposite end 452 of the rod protrudes through an aperture in the frame. A nut 450 acting on a spacer on the rod is utilized to vary the compression of spring 448.

Precise location of the neutral position is accomplished by adjusting the arm 442 in any known conventional manner, about its fixed fulcrum 456 and relative to the link 445. The adjustable arm 442 in turn adjusts the roller 436 that is centered in the cam V until there is no ground wheel rotation. Once the neutral position is so located, an electrical neutral start switch 458 is adjusted relative to the cam follower 430 to enable the neutral position to be sensed electronically. This is accomplished by the neutral start switch striker 460 which is connected to the cam follower 430 proximate the rod. The switch 458 is adjusted relative to the striker 460 with the transmission in neutral by means of a plate (not shown) which is connected to the transmission. In order to adjust the switch 458 relative to the striker 460, the plate has at least two elongated slots (not shown) formed therein.

The foot pedal control system 404 is provided for selectively operating the vehicle in either the forward or reverse direction. To rotate the transmission swash plate arm or cam 420 from its neutral position and thereby drive the ground wheels, the forward and reverse pedal system 404 is connected to the neutral position location system 402 by an adjustable connection rod 462.

The foot pedal control system is right foot operated. The foot pedal control system consists of inboard 470 (forward) and outboard 472 (reverse) pedals having respective arms 474, 476 pivotally mounted on a shaft 480. Forward and reverse links 482, 484 are respectively connected to the pedal arms 474, 476 and to a transfer pivot arm 486. A spring 488 is attached to the reverse link 484 through slot 490. The transfer pivot arm 486 is also connected to the adjustable connection rod 462 which is connected to and moves the swash plate arm 420 which in turn is attached to the hydrostatic transmission.

As clearly seen in FIG. 11, the reverse link 484 is attached to the reverse pedal arm 476 at a point above the pedal shaft 480 and is connected to the transfer pivot arm 486 at a pivot point 496 below the connection rod pivot point connection 498. The forward link 482 is connected to the forward pedal arm 474 at a point 500 below the shaft 480 and to the transfer pivot arm 486 at a pivot point 502 below both the reverse link pivot 496 and the connection rod pivot point 498.

The relative locations of the three transfer pivot arm connection points provides the means by which the pedal system is able selectively to propel the vehicle in either the forward or reverse direction and controls the relative forward and reverse speeds. It should be understood by those skilled in the art that the relative speeds caused by movement of the forward and reverse pedals could be varied as desired by varying the relative lengths of the links 482 and 484.

As illustrated, an operator utilizes the inboard pedal 470 to operate the mower in the forward direction and the outboard 472 pedal to operate the mower in the reverse direction. By depressing the respective pedals varying distances, an operator can control the ground speed of the mower in either the forward or reverse direction.

If neither pedal is depressed, the neutral return system 402 automatically positions the hydrostatic transmission in the neutral position. The return system is activated when the operator releases either pedal 470 or 472. When either pedal is released from the depressed position, the neutral return system slows the ground speed rapidly from that which the vehicle was operating to zero without brake assistance by automatically returning the transmission to the neutral position.

As shown in FIG. 11, when the forward pedal 470 is depressed, the forward arm 474 is rotated clockwise about the shaft 480, rotating the transfer pivot arm 486 clockwise about its mounting shaft 487. This rotation compresses the connection link 462 thereby rotating the cam arm 420 clockwise about its pivotal mounting 419 causing the roller 436 to contact the forward edge 504 of the V profile surface 426. The rotation of the cam 420 causes the cam follower 430 to rotate counterclockwise about a pivot point 506 thereby compressing the spring 448 on rod 444. Upon release of the forward pedal 470, rod spring 448 urges the cam follower 430 to return the roller 436 to the apex 440 of the cam V 426. A shock absorber 510 provides for even compression and decompression of the rod spring 448 and, thus, even, smooth deceleration or acceleration of the vehicle.

The rod spring 448 also serves to force the cam follower and the cam to the neutral position. The shock absorber 510 retards motion in either direction and provides a controlled rate of acceleration or deceleration of the ground speed in either direction. This prevents nearly instantaneous acceleration or deceleration or what is known as the bucking bronco effect and thereby provides for smooth ground speed control.

Elongated slot 490 in the link 484 provides a safety feature for the pedal system. Specifically, since the forward and reverse pedals operate in tandem, which means when the forward pedal is depressed, the reverse pedal is in a raised position, if an object were to strike the reverse pedal arm, it would tend to continue to rotate the reverse pedal 472 counterclockwise about shaft 480. Without slot 490, forward pedal 470 would be rotated further clockwise, thus increasing the speed of the vehicle. However, since the link 484 has slot 490, rotation of reverse pedal 472 counterclockwise will not further rotate the forward pedal 470. This allows an operator to continue to exercise positive control over the vehicle even if an object were to strike the reverse pedal arm.

As shown in FIGS. 10 and 12-14, the turn brake subsystem 412 is left foot operated and consists of an outboard (left turn) 520 and an inboard (right turn) 522 pedal. By depressing either of the respective pedals 520 or 522, braking force is transmitted to the respective wheel, thus enhancing vehicle maneuverability.

The service brake subsystem 410 is right foot operated and applies both the left and right brakes simultaneously. The service brake provides the park brake lock surface and senses the service brake system rest position electronically through utilization of a conventional electric switch which interacts with the service brake.

The left turn brake pedal 520, right turn brake pedal 522 and service brake pedal 524 all pivot about and are mounted on the same shaft 480 which carries the direction control foot pedal system. The left turn brake pedal 520 is connected directly to the shaft 480 which is supported by the two outboard frame members 526, 528 and an interior frame member located proximate a service brake hub.

Figure 10:
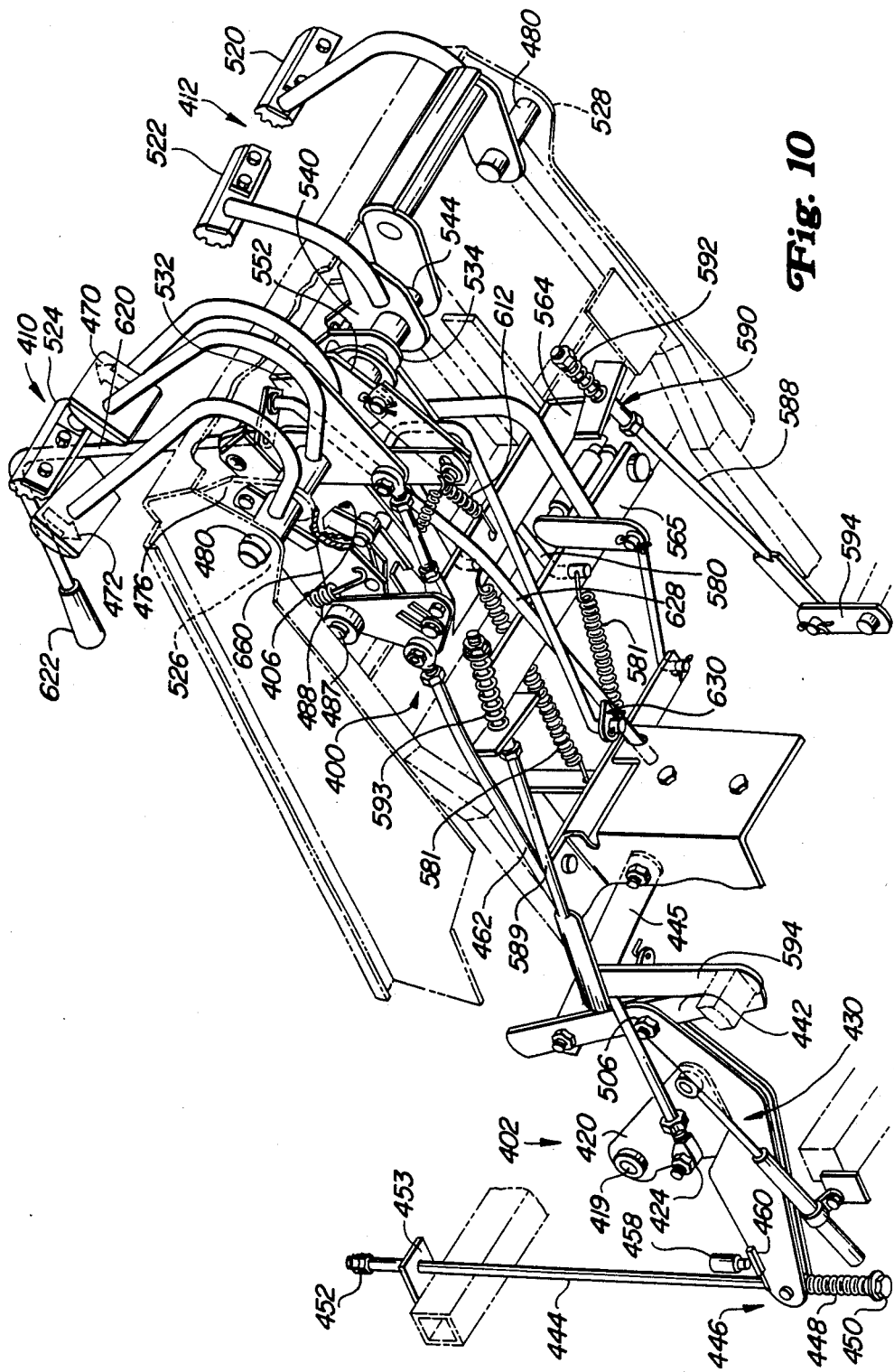
FIG. 10 is a partial perspective bottom view of the front mount mower of FIG. 9.

As shown in FIG. 10, the left turn brake pedal 520 is connected to the shaft 480 proximate frame member 528. An arm 534 is connected to the shaft 480, preferably remote from the pedal 520. The arm 534 has an aperture 536 forming a bearing surface to receive the outturned end of brake rod 538.

The right turn brake pedal 522 is connected to a hub 544 which is rotatably mounted about shaft 480. An arm 540 is connected to the hub 544 and has a brake rod connection aperture 548 which forms a bearing surface for receiving an end of a second rod 580.

The service brake pedal 524 is connected to a second hub 550 which also rotates about the shaft 480. Hub 550 has three arms 552, 553 and 554 connected thereto. A bar 555 is connected to the arms 552 and 554 and extends parallel to the shaft 480 so that it can make contact with arms 534 and 540 when the pedal 524 is depressed. A third hub 556 having an L-shaped arm 558 is rotatable about the service brake hub 550 proximate the arm 552. This hub 556 is adjustably mounted on the service brake hub 550 by a set screw 600 and the L-shaped arm 558 extending from hub 556 has a leg 560 which is adapted for contacting and interacting with a brake sensing switch mounted to the frame. The hub 556, L-shaped arms 558 and leg 560 form a switch striker.

Figure 13:
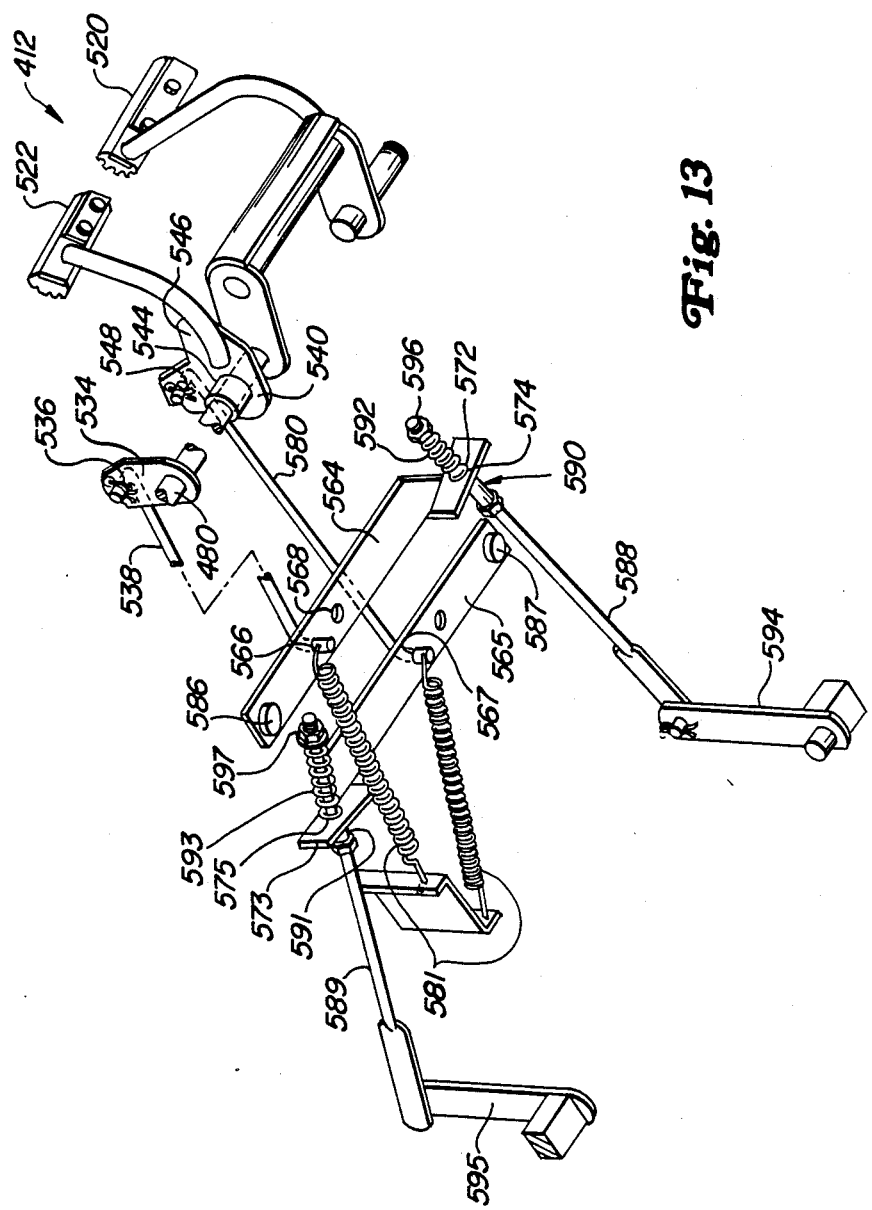
FIG. 13 is a partial perspective view of the brake system of the front mount mower of FIG. 10.

As seen in FIG. 13, the two rods 538, 580 respectively extend from and connect the brake pedal arms 534, 540 with transfer arms 564, 565 respectively by down-turned rear ends which are received in apertures 566, 567 respectively in arms 564 and 565. Brake return springs 581 are attached to the rear down-turned end of each of the brake rods 538, 580. The two transfer arms 564, 565 have respective pivot points 586, 587 at first ends thereof and have respective flanges 572, 573 at second ends thereof. The flanges 572, 573 are respectfully provided with connection apertures 574, 575 in which are received adjustable brake rods 588, 589. The brake rods 588 and 589 are respectfully pivotally connected to conventional drum brake arms 594, 595. The adjustable brake rods 588, 589 are slidably received in the apertures 574, 575 in the transfer arm flanges 572, 573 and have tubes 590, 591 received thereon for covering one end of the rods 588, 589 for protecting the adjustment threads thereof. Compression springs 592, 593 are mounted over the tubes and are secured thereon by threaded nuts 596, 597 received on threaded ends of the rods 588, 589. When a given turn brake pedal 520 or 522 is applied, the associated transfer arm 564 or 565 pivots forwardly and effects forward movement of the associated brake rod 588 or 589 to effect engagement of the brake controlled by that rod.

Depression of the service brake pedal 524 will cause both turn brake arms 534, 540 to rotate. The middle service brake hub arm 553 has a profile shape for engaging the parking brake system 414 (see FIG. 14). This profile guides, retains and locks a park brake pawl 606.

The arm 552 has a lower extending portion with a connection aperture for interfacing with the cruise control system. This arm 552 also has a profile shape which engages the front and provides a rest stop position for all three pedals. A tension return spring 665 attached to the arm 652 biases the service brake pedal 524 toward it at rest position.

The electrical switch affixed to the frame has a plunger for interacting with the switch striker 560. Having the service brake 524 at rest, the switch striker 560 is adjusted to depress the switch plunger. With this construction, the service brake position can be electronically sensed relative to the rest brake position and when the service brake 524 is rotated, the striker 560 will disengage the switch plunger and thus indicate that the service brake 524 is being depressed.

The neutral start switch 458 and the brake sensing switch are coordinated with an electrical switch (not shown) which senses pressure on the operator's seat such that when the seat switch senses insufficient pressure, the vehicle must be in neutral as determined by the neutral start switch 458 and the service brake 524 must be engaged as determined by the brake sensing switch.

Figure 14:
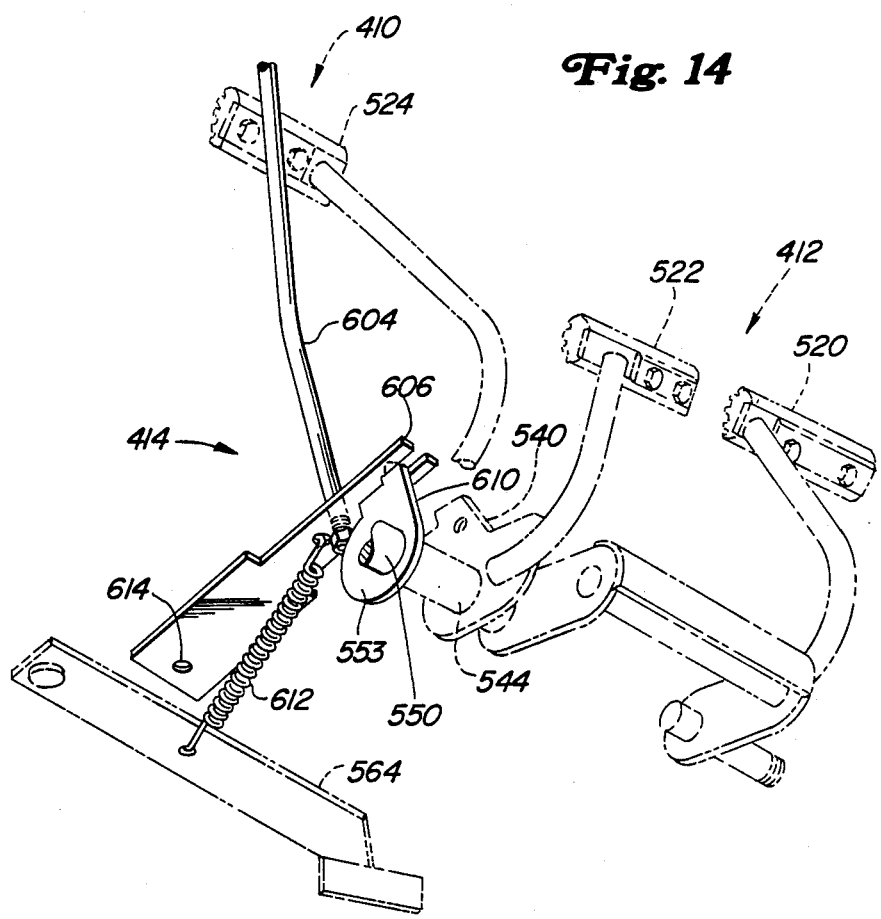
FIG. 14 is a partial perspective view of the parking brake system of the front mount mower of FIG. 10.

As shown in FIG. 14, the parking brake system 414 is a hand operated system which, as illustrated, requires that a rod 604 be lifted and lowered from an inverted J-shaped slot while simultaneously depressing the service brake pedal 524 until the park brake pawl 606 falls into the locked position provided by the middle arm 553 on the service brake hub 550. The park brake pawl 606 is pivotally mounted to the frame. A spring 612 biases the frame pivot 614 toward the parking brake arm 553. An aperture in the park brake pawl 606 is used to connect the parking brake rod 604 to the pawl 606. The rod 604 is adjustable for positioning the pawl 606 relative the arm 553 so that the pawl 606 will not engage the arm 553 in the rest position.

In order for an operator to leave the operator's seat with the engine running, the parking brake must be engaged, i.e. the arm 558 on hub 556 must not depress the switch plunger (see FIG. 12) and the transmission must be in neutral, i.e. the neutral start switch plunger must be depressed (see FIG. 11). If the seat pressure switch senses low pressure or insufficient pressure and both the above conditions are not met, the engine will automatically shut down.

Figure 15:
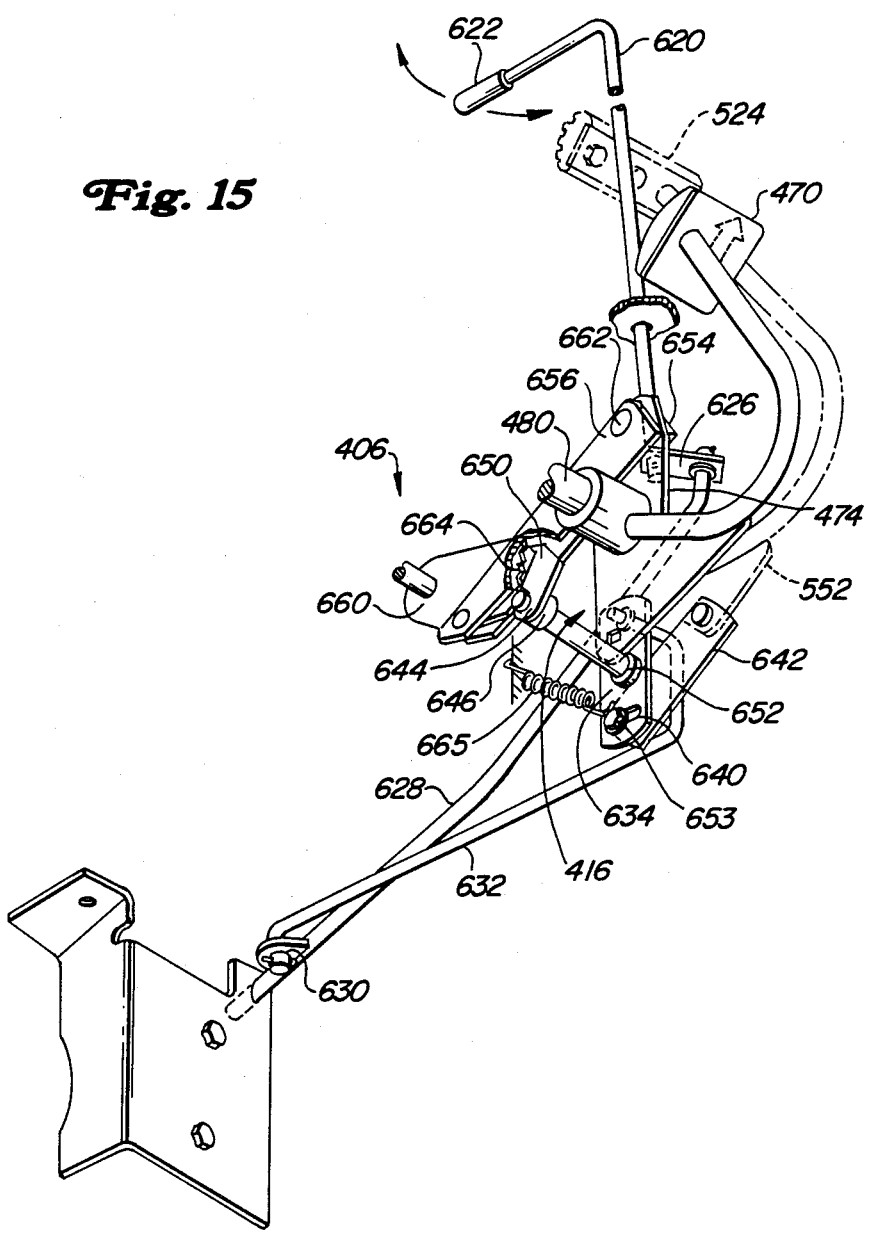
FIG. 15 is a partial perspective view of the cruise control system of the front mount mower of FIG. 10.
Figure 16:
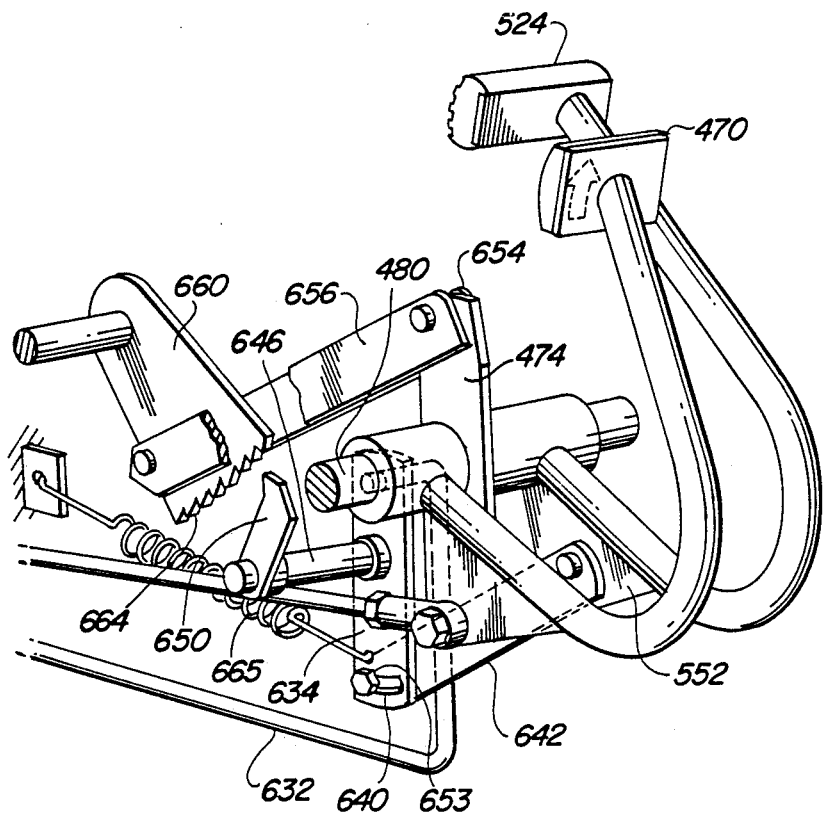
FIG. 16 is a partial perspective view of the cruise control system of the front mount mower of FIG. 10.

As illustrated in FIGS. 10 and 15, the cruise control system 406 is right-hand operated with an L-shaped control lever or rod 620 being located just beneath the steering wheel. The cruise control system 406 can only be engaged when the front mount mower is moving in the forward direction. To engage the cruise control, rotation of the lever 622 about the axis of the rod 620 is required. As with the compact utility tractor cruise system, disengagement can be accomplished in three ways: (1) by reverse or counterclockwise rotation of the lever 620 about the axis of end 620, (2) further depressing the forward foot pedal 470, and (3) depressing the service brake pedal 524.

The cruise control system is a mechanical linkage system that utilizes a ratchet and pawl device to positively position the transmission swash plate. The cruise control system linkage consists of the L-shaped lever or rod 620 having a knob 622 at the short end of the L and being conventionally connected to a first cruise control arm 626 at the other end. The first cruise control arm 626 is also conventionally connected to one end of a first cruise control link 628 having a pivot point aperture 630 attached proximate its other end. A second cruise control link 632 has a down-turned rear end received in the pivot point aperture 630 and has an in-turned forward end received in an aperture provided in an upper end of a second cruise control arm 634. The second cruise control arm 634 has an elongated slot 640 adjacent its lower end and is connected to a lower extension of the service brake arm 552 by a third cruise control link 642. A shaft 646 pivotally connected to the vehicle frame connects a pawl 644 to the second arm 634 at a central pivot point 652. The third link 642 connects the second arm 634 by pivot bolts 653 received in the slot 640 at a point below the shaft 480.

Two connecting links 654, 656 positioned on opposite sides of the forward foot pedal arm 474 have lower ends connected to a pivotable ratchet 660 and upper ends pivotally connected to the forward control pedal arm 474 at a pivot 662 above the pedal shaft 480. As the forward pedal 470 is depressed, the two links are rotated clockwise about the pivot 480 lowering the ratchet 660 relative to the pawl 644.

As illustrated, to engage the cruise control system, after depressing the forward pedal 470, the cruise control lever 620 is hand rotated about the vertical axis of the rod 620, which is rotatably mounted in a framework of the tractor. As the rod 620 is rotated, the first arm 626 is swung about the end of the rod 620 to move the first cruise control rod 628 rearwardly. The rod 628 in turn pulls the second cruise control rod 632 rearwardly, rotating the second cruise control arm 634 counterclockwise about the shaft 646. This movement also results in the rotation of a hook member 650 carried on the pawl 644 counterclockwise about the shaft 646. The hook member 650 is thus rotated into engagement with one of a plurality of teeth 664 in the ratchet 660.

The cruise control system can be applied only with the forward foot pedal because depression of the reverse pedal rotates the ratchet teeth out of alignment with the pawl thereby preventing engagement of the ratchet teeth by the pawl.

As stated above, cruise control disengagement is accomplished in three ways: (1) by an operator further depressing the forward foot pedal 470, (2) by an operator depressing the service brake pedal 524, and (3) by an operator rotating the cruise control lever 620 toward the operator's seat (clockwise).

In the last two of the above three situations, the hook member 650 is literally pulled away from engagement with the ratchet 660. In the case of further depressing the forward foot pedal 470, the contact pressure between the hook member 650 and the ratchet teeth 664 is released allowing a spring 665 to rotate the second cruise control arm 634 clockwise about the axis of shaft 646 thereby rotating the hook out of contact with the ratchet teeth.

Since the arm 552 of service brake pedal 524 is connected by link 642 to the slot 640 in the second cruise control arm 634 initial movement of the pedal 524 will not effect the cruise control. Additional movement of the pedal 524 will cause the second arm 634 to rotate clockwise about the axis of shaft 646, rotating the pawl 650 out of contact with the teeth 664.

When the cruise control knob 622 and its rod 620 is rotated counterclockwise about the axis of the rod 620, the hook 650 will be moved out of contact with the teeth 664.

Therefore it can be seen that the improved system and method of the present invention provides positive foot control, selectively engageable and disengageable cruise control and braking. As illustrated, the pedal control system requires deliberate motion in changing from forward to reverse, yet the foot motion is kept minimal relative to the vehicle frame. Since the foot pedals are automatically returned to the neutral position by the neutral return system upon removing pressure, the vehicle ground motion is smoothly reduced and quickly stopped. The cruise control system, when engaged, provides for positive swash plate location thereby eliminating the need for an operator to apply a constant foot pressure to the forward pedal. If an operator should desire to regain manual control of the vehicle from the cruise control, the cruise control is easily disengaged by slightly depressing the forward foot pedal beyond the position in which the cruise control has locked the pedal. This disengagement method provides for smooth transition between automatic cruise controlled and operator controlled ground speed. The cruise control system can also be selectively disengaged by rotating the cruise control lever back toward the operator or by depressing the service brake.

The maneuverability enhancing left and right turn brake pedals of the brake system provide for turning assistance and thus enhancing maneuverability even while the cruise control system is engaged.

In an emergency, in order to positively stop the vehicle, the right foot must be removed from the forward or reverse foot control pedal and utilized to engage the service brake control pedal. The electrical switches incorporated into this system provide transmission neutral position, operator presence and brake pedal position sensing.

While the forms of apparatus herein described constitute preferred embodiments of this invention, it is to be understood that the invention is not limited to these precise forms of apparatus, and that changes may be made without departing from the scope of the invention, which is defined in the appended claims.

What is claimed:

1. A mechanism for initially precisely locating the neutral position of a variable speed transmission installed in a vehicle comprising:
   a cam with a V-shaped profile, said cam having an aperture which pivotally connects it at one end thereof to said vehicle;
   a cam follower operatively attached to said vehicle and having two spaced apart elements;
   a roller operatively positioned between said two spaced apart elements for interacting with said V profile of said cam;
   a rod operatively connected to said vehicle at one end and slidably coupled with the cam follower at the other end;
   a spring operatively positioned between said other end of said rod and said cam follower for biasing said cam follower towards said one end of said rod;
   a striker operatively coupled to said cam follower proximate said rod; and
   an adjustable electrical switch having a plunger for interacting with said striker such that when said transmission is in the neutral position, said roller is positioned in the apex of said V shaped profile and said striker is contacting said switch thereby actuating said switch plunger.

2. A cruise control mechanism for a vehicle having a variable speed transmission, a means for driving said vehicle including a forward and reverse pedal and a master brake and a turn brake system comprising:
   two connecting links coupled with the forward pedal for movement therewith;
   a pivotable ratchet with teeth is pivotably connected between said connecting links;
   a shaft carrying a pawl having a means for selectively engaging the various teeth of said ratchet when said vehicle is being driven in a forward direction upon movement of the forward pedal; and
   a strap fastened to said pawl shaft and coupled with a cruise control linkage rod for selectively moving the pawl shaft and pawl, said strap also connected with an adjustable link which in turn is connected to said master brake.

3. The cruise control mechanism of claim 2 wherein the cruise control mechanism is selectively disengaged by depressing said forward control pedal.

4. A system for controlling the ground speed of a maneuverable off-road vehicle having an operator seat, an engine and a variable speed transmission coupled for driving a pair of ground wheels and having a control shaft selectively moveable among neutral, forward and reverse drive positions, and a pair of brakes respectively coupled to the pair of wheels, said system comprising:
   means, operatively connected to said control shaft, for precisely locating the neutral position of said control shaft including a cam operatively attached to said transmission, said cam having a V-shaped profile with an aperture pivotally connecting said cam at its one end to said vehicle and another aperture adjacent said V-shaped profile;
   a cam follower operatively attached to said vehicle and consisting of two spaced apart elements;
   a roller operatively positioned between said two cam follower elements for interacting with said V profile of said cam;
   a rod operatively connected to said vehicle at one end and slidably connected to said cam follower at the other end;
   a spring operatively positioned between said other end of said rod and said cam follower for biasing said cam follower towards one end of said rod;
   a striker operatively attached to said cam follower proximate said rod;
   an electrical switch having a plunger adjustably attached to said transmission for interacting with said striker such that when said control shaft is in the neutral position, said roller is positioned in said apex of said V shaped profile and said striker is contacting said switch such that said switch plunger is depressed;
   direction control means, operatively connected to said control shaft and said precisely locating means, for selectively controlling said locating means such that said vehicle is driven in either a forward or a reverse direction;
   brake control means, operatively connected to said pair of brakes, for selectively stopping said vehicle;
   turning control means, operatively connected to said brake control means, for selectively engaging one or the other of said pair of brakes thereby enhancing said vehicle's maneuverability;
   cruise control means, operatively connected to said control shaft, said direction control means and said brake control means, for selectively maintaining said control shaft in a constant position while said vehicle is moving in said forward direction; and
   means, operatively interconnecting said direction control means, said turning control means and said brake control means, for selectively disengaging said cruise control means such that when said cruise control means is engaged, engagement of either of said forward direction control means or said brake control means or disengagement of said cruise control means is operative to disengage said cruise control means.

5. A system for controlling the ground speed of a maneuverable off-road vehicle having an operator seat, an engine and a variable speed transmission coupled for driving a pair of ground wheels and having a control shaft selectively moveable among neutral, forward and reverse drive positions, and a pair of brakes respectively coupled to the pair of wheels, said system comprising:
 means, operatively connected to said control shaft, for precisely locating the neutral position of said control shaft;
 direction control means, operatively connected to said control shaft and said precisely locating means, for selectively controlling said locating means such that said vehicle is driven in either a forward or a reverse direction, said direction control means including a shaft and at least two right foot operated control pedals operatively connected to the transmission, one of said pedals controlling the forward ground speed and the second of said pedals controlling the reverse ground speed thereof;
 means operatively connected with said foot pedals, for automatically returning said control shaft to said neutral position;
 an arm connected to the forward control pedal and extending above and below said shaft;
 a transfer pivot arm means pivotably connected to said vehicle and having at least three connection points;
 a connecting link operatively connected to a lower portion of said forward control pedal arm and one of said transfer pivot arm means connection points;
 a reverse control pedal rotatably mounted on said shaft and having an arm extending above said shaft;
 a second connecting link operatively attached to said reverse pedal and a second of said three transfer pivot arm means connection points;
 a third connecting link connecting the transfer pivot arm means with said precisely locating means;
 brake control means, operatively connected to said pair of brakes, for selectively stopping said vehicle;
 turning control means, operatively connected to said brake control means, for selectively engaging one or the other of said pair of brakes thereby enhancing said vehicle's maneuverability;
 cruise control means, operatively connected to said control shaft, said direction control means and said brake control means, for selectively maintaining said control shaft in a constant position while said vehicle is moving in said forward direction; and
 means, operatively interconnecting said direction control means, said turning control means and said brake control means, for selectively disengaging said cruise control means such that when said cruise control means is engaged, engagement of either of said forward direction control means or said brake control means or disengagement of said cruise control means is operative to disengage said cruise control means.

6. A system for controlling the ground speed of a maneuverable off-road vehicle having an operator seat, an engine and a variable speed transmission coupled for driving a pair of ground wheels and having a control shaft selectively moveable among neutral, forward and reverse drive positions, and a pair of brakes respectively coupled to the pair of wheels, said system comprising:
 direction control means, operatively connected to said control shaft, including at least two right-foot operated foot control pedals, one for controlling the forward ground speed and one for controlling the reverse ground speed;
 means, operatively connected to said control shaft, for precisely locating the neutral position of said control shaft, said precisely locating means including an adjustable arm for establishing a fixed fulcrum, a connection rod operatively connected to said direction control means, a cam shaped arm operatively connected to said control shaft and having means for mounting a shock absorber means and for connecting said connection rod thereto, a cam follower arm, operatively connected to said adjustable arm at one end thereof, having a cam follower roller operatively positioned thereto and having a pivotal link at the other end thereof, a rod, operatively connected to said pivotal link, having at one end a spring between the head of said rod and the cam follower arm, the second end of said rod protruding through a hole in said vehicle frame, and an adjustable nut connected to said spring end of said rod for varying the compression of said spring;
 brake control means, operatively connected to said pair of brakes, for selectively stopping said vehicle;
 turning control means, operatively connected to said brake control means, for selectively engaging one or the other of said pair of brakes thereby enhancing said vehicle's maneuverability;
 cruise control means, operatively connected to said control shaft, said direction control means and said brake control means, for selectively maintaining said control shaft in a constant position while said vehicle is moving in said forward direction; and
 means, operatively interconnecting said direction control means, said turning control means and said brake control means, for selectively disengaging said cruise control means such that when said cruise control means is engaged, engagement of either of said forward direction control means or said brake control means or disengagement of said cruise control means is operative to disengage said cruise control means.

7. A system for controlling the ground speed of a maneuverable off-road vehicle having an operator seat, an engine and a variable speed transmission coupled for driving a pair of ground wheels and having a control shaft selectively moveable among neutral, forward and reverse drive positions, and a pair of brakes respectively coupled to the pair of wheels, said system comprising:
 means, operatively connected to said control shaft, for precisely locating the neutral position of said control shaft, said precisely locating means further including an adjustable arm for establishing a fixed fulcrum, a connection rod operatively connected to said direction control means, a cam shaped arm operatively positioned on said control shaft and having means for mounting a shock absorber means and for connecting said connection rod thereto, a cam follower arm, operatively connected to said adjustable arm at one end thereof, having a cam follower roller operatively positioned therein and having a pivotal link at the other end thereof, a rod, operatively connected to said pivotal link, having at one end a spring between the head of said rod and said cam follower arm, a second end protruding through a hole in said vehicle frame, and an adjustable nut connected to said spring end of said rod for varying the compression of said spring;

direction control means, operatively connected to said control shaft and said precisely locating means, for selectively controlling said locating means such that said vehicle is driven in either a forward or reverse direction, said direction control means including a forward ground speed pedal and a reverse ground speed pedal;

brake control means, operatively connected to said pair of brakes, for selectively stopping said vehicle;

turning control means, operatively connected to said brake control means, for selectively engaging one or the other of said pair of brakes thereby enhancing said vehicle's maneuverability;

cruise control means, operatively connected to said control shaft, said direction control means and said brake control means, for selectively maintaining said control shaft in a constant position while said vehicle is moving in said forward direction, said cruise control means including a pivotable ratchet operatively connected to said direction control means, a pawl having a shaft and a means for selectively engaging said ratchet when said vehicle is being driven in the forward direction only, two connecting links located on either side of said forward foot pedal and connected to said pivotable ratchet, an arm fastened to said pawl shaft and having two connection means, said first means receiving a second cruise control link, said second means receiving an adjustable link connected to said brake control means; and means, operatively interconnecting said direction control means, said turning control means and said brake control means, for selectively disengaging said cruise control means such that when said cruise control means is engaged, engagement of either of said forward direction control means or said brake control means or disengagement of said cruise control means is operative to disengage said cruise control means.

8. The system of claim 7 wherein said cruise control means is selectively disengaged by depressing said forward pedal.

9. The system of claim 7 wherein said cruise control means further comprises:
   a hand level operatively connected to said pawl.

10. The system of claim 9 wherein said cruise control means is selectively disengaged by rotating said hand lever thereby disengaging said pawl from said ratchet.

11. A cruise control mechanism for a vehicle having a variable speed transmission, a means for driving said vehicle, and a master brake comprising:

a cruise control latch including two spaced apart connecting links operatively connected to said driving means and having at least two apertures including one near each end of a connecting link means for pivotably mounting said connecting links to said vehicle utilizing one of said apertures, a ratchet pivotally attached to said connecting links, a shaft operatively attached to said vehicle, a pawl carried on said shaft and having means for selectively engaging said ratchet when the vehicle is being driven in a forward direction;

a strap operatively connected to said pawl, said strap having an elongated slot near one end;

a control lever operatively attached to said vehicle;

a first cruise control rod operatively connected to said control lever;

a third connecting link operatively connecting said strap and said master brake; and a second cruise control rod operatively connecting said first cruise control rod and said strap.

* * * * *